Jan. 20, 1970    R. G. HENIKA    3,490,916
BREW PROCESS FOR MAKING YEAST LEAVENED BAKERY
PRODUCTS AND COMPOSITION THEREFOR
Filed April 1, 1968
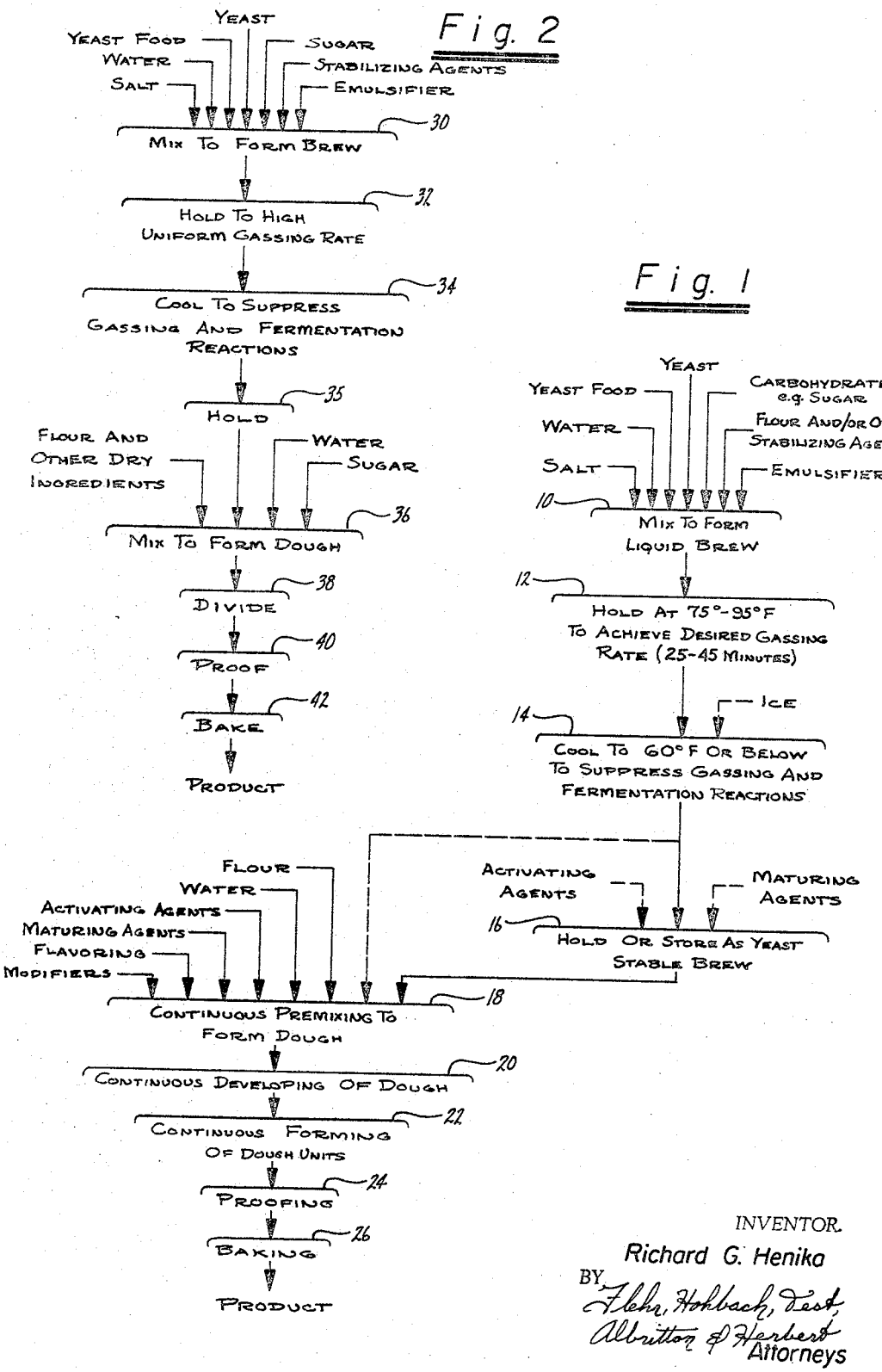
INVENTOR.
Richard G. Henika
BY
Attorneys United States Patent Office 3,490,916
Patented Jan. 20, 1970

3,490,916
BREW PROCESS FOR MAKING YEAST LEAVENED BAKERY PRODUCTS AND COMPOSITION THEREFOR
Richard G. Henika, Alamo, Calif., assignor to Foremost-McKesson, Inc., San Francisco, Calif., a corporation of Maryland
Continuation-in-part of application Ser. No. 542,081, Apr. 12, 1966. This application Apr. 1, 1968, Ser. No. 717,512
Int. Cl. A21d 2/00
U.S. Cl. 99—90                17 Claims

ABSTRACT OF THE DISCLOSURE

Yeast stable liquid brews suited for use in commercial baking processes in which reliance is placed on biochemical agents for developing and maturing the dough. The stable brews are prepared by mixing essential brew ingredients (e.g., water, yeast, yeast food and controlled amounts of sugar and salt) with added flour and/or certain other stabilizing agents, holding at yeast fermenting temperatures for a very short period of time to initiate gas production, and thereafter cooling to effectively inhibit the gas producing activity of the yeast cells and temporarily suppress subsequent fermentation reactions. The liquid brews in such stabilized form are adapted to immediate or delayed use, and can be stored for periods ranging up to 24 hours or longer with little or no change in leavening activity. Used in the preparation of leavened bakery doughs, the stable brews provide nearly constant effects on the dough developing and maturing activities of the biochemical agents, with minimum effects due to uncontrolled fermentation reactions. The availability of stable brews with the specified characteristics avoids present difficulties related to sequentially setting brews at relatively short time intervals and, in preferred embodiments, makes possible reduced water and tankage requirements with enhanced flexibility of operations for the commercial baker.

CROSS REFERENCE TO RELATED APPLICATIONS

This application is a continuation-in-part of copending application Ser. No. 542,081, filed Apr. 12, 1966 now abandoned.

BACKGROUND OF THE INVENTION

Conventional processes for the manufacture of leavened break, rolls, buns, sweed goods, and the like depend upon a substantial fermentation period to develop certain dough properties such as short mix time and proper extensibility viscosity and relaxation required for effective machine processing. Fermentation with simultaneous aging of the dough also serves to develop desired properties in the baked product such as loaf volume, grain quality, texture and flavor.

Prior to the advent of successful continuous-mix bread operations (e.g., see Baker Patent 2,953,460), bread and like products were conventionally made according to the so-called "straight dough" and "sponge dough" methods. As particularly pointed out in Henika et al. Patent 3,053,-666, the straight and sponge dough methods rely on prolonged periods of fermentation (ranging from 2½ to 6 hours) to effect continuing production of carbon dioxide and to produce certain chemical and environmental changes to assist subsequently in obtaining proper development in the mixer and proper maturity during proof and bake. Where reliance is placed on a preliminary fermentation step using a liquid brew, as in the conventional continuous-mix bread operations, a substantial period of preliminary fermentation (i.e., ranging from 2½ to 6 hours) is again relied upon to develop characteristics essential for further effective processing. In all these prior processes, it is essential that fermentation reactions initiated by the yeast (whether in the sponge, in the brew or on mixing of the dough) continue throughout the subsequent processing, if necessary desired characteristics in the dough and in the baked product are to be obtained.

For example, in the commercially important continuous-mix bread operations which depend upon special high speed mixing equipment, it is vital that the liquid brews reach an optimum stage in the fermentaton reactions to insure the obtaining of necessary dough and bread properties. It is well known that even the best continuous-mix breads generally reflect doughs which are more uniformly mixed but less developed than good sponge doughs, as evidenced by the final bread properties. It is essential therefore that the liquid brews be carefully controlled as to fermentation characteristics prior to incorporation with remaining dough ingredients in the continuous-mix apparatus. In practice, the baker usually prepares a number of individual brews, each fermented about 2½ hours, for sequential or batch addition to the continuously operating machinery. Because of constant fermentation changes occurring in the separate liquid brews, the timely preparation, fermentation and use of the individual brews in continuous-mix operations constitutes a problem of considerable difficulty for the baker, particularly as respects the flexibility of commercial operations. As will be apparent, it is reliance upon the relatively unstable period of preliminary fermentation which detracts from the flexibility of these brew operations.

SUMMARY OF THE INVENTION AND OBJECTS

This invention relates generally to a method for the preparation of yeast fermented liquid brews in stable form, and also to a method of using such brews in processes for the manufacture of commercial yeast leavened bakery products such as bread, rolls, buns, sweet goods, and the like. It additionally pertains to yeast stable brew compositions useful in preparing doughs for such products.

As disclosed in Henika et al. Patent 3,053,666, it is now possible to employ certain biochemical activating and maturing agents in reactions with the flour and other dough ingredients to largely replace and duplicate the developing and maturing actions of a long fermentation step. More specifically, these biochemical agents introduced into bread, roll and bun mixes develop desired dough and product characteristics independently of fermentation reactions, so that fermentation is essentially relied upon only to insure that the yeast cells reach a high and uniform gassing rate prior to dividing and forming the individual dough units for baking. As a consequence, the continuing fermentation reactions of the more or less conventional bakery processes to which the biochemical agents have so far been adapted (e.g., modified straight dough and continuous-mix) are neither required nor desired and, in fact, may actually produce conditions of instability which complicate the processing and provide problems for the baker.

It is therefore an object of the present invention to provide a novel bakery process, making use of yeast stable liquid brews, which largely overcomes the foregoing problems in dough systems employing biochemical activating and maturing agents.

Another object of the invention is to provide a novel method for preparing liquid brews in yeast stabilized form, capable of being held or stored for substantial periods of time, for subsequent use in the leavening of dough.

Still another object of the invention is to employ yeast stable brews of such character in new bread and roll making processes (employing biochemical activating and maturing agents) wherein optimum dough and bread characteristics are developed in a novel manner.

A further object of the invention is to provide yeast stable brew compositions in a novel form, particularly adapted to producing bakery products of very high quality by the foregoing methods.

According to the present invention, liquid brews are prepared in stable form by initially incorporating flour and/or certain other stabilizing agents into the mixture of essential brew ingredients (e.g., including water, yeast and yeast foods together with controlled amounts of sugar and salt) and thereafter fermenting the brew for a relatively short period of time to obtain a desired gassing activity, following which the stabilized brew is immediately cooled to inhibit the gas producing activity of the yeast cells and to substantially suppress continuing fermentation reaction. Liquid brews processed in this manner are essentially stable, due to arresting of the fermentation reactions, and can be held at reduced temperatures for prolonged, indefinite periods of time ranging up to 24 hours or longer. When desired (and without relation to any fermentation time), all or part of liquid brews so produced can be incorporated into a dough mix in conventional fashion, the gas producing activity of the yeast cells being again initiated in the dough with essentially no change in leavening activity, as measured by the dough and bread properties. More specifically, the stable brews so prepared can be immediately incorporated into a dough, or so incorporated after a short holding period, or alternatively, can be held overnight in storage for use in the next day's baking activities, thus greatly enhancing the flexibility and efficiency of use of plant equipment and personnel. Of particular significance is the fact that the yeast stable brews, in dough systems using the new biochemical activating and maturing agents, achieve a uniform controlled leavening of the dough without any necessity for reliance upon continuing, hard-to-control fermentation reactions.

In addition to providing substantial advantages and economies to the commercial baker (through avoidance of the necessity, expense and inconvenience involved in sequentially fermenting individual brews to optimum conditions), use of the yeast stable brews of the present invention makes possible substantial and important improvements in bread and dough properties. These improvements, obtainable through use of the brews in conjunction with the activating and maturing agents disclosed in our prior Patent 3,053,666, are briefly summarized as follows:

(1) The reactions between the flour and the chemical activating and maturing agents are more readily controlled by the baker in the presence of the yeast stable brews, thus providing bakery products of higher and more uniform quality than is obtainable with processing dependent upon continuing fermentation reactions.

(2) The liquid brews can be formulated to provide only gas production, thereby making possible more uniform processing conditions together with economies in time, expense, space, equipment and labor.

(3) The flour reactions between the activating agents during mixing, and between the flour and maturing agents during floor time, proof and early bake, provide a higher and more uniform degree of development and maturity than available from a brew fermentation step, alone, producing higher quality bread.

(4) The yeast stable brews, through formulation to avoid interference with the reactions between the flour and the chemical agents, make possible uniform leavening consistent with controlled uniform development and maturing of the dough, to provide baked goods of unusually high and uniform characteristics.

Additional objects and advantages of the present invention will appear from the following description in which preferred embodiments have been set forth in detail in conjunction with the accompanying drawing.

BRIEF DESCRIPTION OF THE DRAWING

FIGURE 1 is a flow sheet illustrating the method of preparing yeast stable brews in accordance with the present invention and, also the subsequent use of such brews in continuous-mix bakery operations in accordance with the present invention.

FIGURE 2 is a flow sheet illustrating the use of the yeast stable brews of the present invention in a modified straight dough bakery process.

DESCRIPTION OF THE PREFERRED EMBODIMENTS

FIGURE 1 is a flow sheet illustrating the stable brew method of the present invention, and also the use of yeast stable brews so produced in continuous-mix bread and dough processing of the type disclosed in copending application, Ser. No. 542,081, of which the present application is a continuation-in-part.

Referring to FIGURE 1, essential ingredients for making a yeast fermentable liquid brew are supplied to step 10. Such ingredients include the yeast, yeast food, part of the water, salt, a fermentable carbohydrate (e.g., sugar), and an emulsifier. The sugar is added in an amount just sufficient to initiate yeast fermentation reactions to produce gas at a desired uniform relatively high rate. The stabilizing agent, comprising a proportion of the flour and/or certain other stabilizing agents, as hereinafter described, is also added in step 10. Following the mixing, the described brew ingredients are held or fermented at a temperature within the range from about 75 to 90° F., in step 12, to initiate the desired production of carbon dioxide. The period of brew fermentation is carried out for a relatively short period of time, just sufficient to permit the yeast cells to reach a high uniform gassing rate. Within the range of brew temperatures specified, a brew period of about 25 to 45 minutes is generally sufficient to achieve the desired gassing rate, the length of the brew period being dependent in larger measure on the particular brew temperature employed. Thus, at brew temperatures between about 85 to 90° F., about 30 minutes is required for the yeast cells to reach a high uniform gassing rate. Throughout this brew period and in subsequent stages, the flour and other added stabilizing agents serve to maintain or control the pH of the brew within a desired stabilizing range of about 4.0 to 4.8, without interfering in the gas producing activity of the yeast and the brew.

Immediately following the brew step, the brew is cooled in step 14 to 60° F. or below to effectively inhibit the gas producing acitivity of the yeast cells and to suppress further yeast fermentation reactions. Cooling is preferably accomplished in a relatively short period of time (i.e., within 5 minutes) employing any satisfactory means for the purpose. Thus, cooling can be accomplished by the addition of a measured quantity of ice, or by use of conventional heat exchange or refrigeration equipment. At temperatures of 60° F. or below, control of pH through use of flour and/or other stabilizing agents provides a cooperative effect in inhibiting the gas producing activity of the yeast cells and in suppressing the continuing yeast fermentation reactions. More specifically, the cooperative effects of temperature and pH control provide a yeast stable brew, which, although available for immediate use, can be held or stored in step 16 for subsequent use as needed in commercial bakery operations.

In step 18, the yeast stable brew is mixed with additional ingredients including the remaining flour, water, sugar, flavoring and modifying agents, as required to form a leavened dough. Biochemical agents to activate and mature the dough without reliance on continuing fermentation reactions are also added in step 18. The use of such chemical dough modifying agents is particularly described in our prior Patent 3,053,666. While these activating and maturing agents are usually added with the dough ingredients, in step 18, such agents may also be incorporated in the brew just prior to mixing the latter with the dough ingredients (e.g., see dotted lines in step 16).

In general, it is preferable to add the biochemical agents with the dough ingredients to insure that these agents are introduced in chemically unimpaired form. According to one procedure, the activating agent is introduced in step 18 as part of a blend of a much larger proportion of dry cheddar whey (e.g., 0.25%). The biochemical maturing or oxidizing agents can likewise be incorporated in step 18 with melted shortening, emulsifying agent, syrups, various dough improvers and like dough modifiers. The mixing in step 18 can be carried out on a continuous basis, for example, as the pre-mixing stage (e.g., in the premixer or incorporator unit) of a continuous-mix operation, wherein the mixing is sufficient to obtain a blending of the ingredients into a pumpable mixture or dough. In such equipment, the pre-mixed dough ingredients are immediately subjected to continuous developing in step 20, following which the developed dough is continuously extruded or otherwise divided to form dough units in step 22. Individual dough units are thereafter subjected to proof and bake in steps 24 and 26 in accordance with conventional continuous-mix practice, to obtain the final bakery product (e.g., bread, buns or rolls, etc.).

While the dough processing in FIGURE 1 has been described in conjunction with commercial continuous-mix operations, the yeast stable brews of the present invention can just as easily be incorporated in conventional batch processes. Thus, FIGURE 2 illustrates use of the yeast stable brews in a modified "straight" dough process for the manufacture of bread, rolls, or the like. As shown, the brew ingredients are mixed in step 30 in the same manner as described with reference to step 10 in FIGURE 1. The fermenting or holding in step 32 and the subsequent cooling in step 34 can likewise correspond to the previously described steps 12 and 14 in FIGURE 1. Subsequently, however, the dough is prepared in a single-step "straight dough" sequence, represented in step 36, wherein all the ingredients are mixed together as a single batch. The remaining flour and other dry ingredients are also incorporated in this step along with the remaining water, sugar or other fermentable carbohydrate, as used in the "straight dough" procedure. The mixed dough is then divided, proofed and baked in steps 38, 40 and 42, to provide bakery products by the batch method. It will be appreciated that the processing of FIGURE 2 is particularly adapted to the smaller commercial baker. However, the availability of stable brews which may be held, for example, in step 35, for prolonged periods of time, greatly facilitates the operations of the small baker whose problems parallel those of the larger commercial baker—except for scale.

In general, it is believed that use of yeast stable brews, in the above manner, avoids several problems inherent in the continuing fermentation reactions associated with the use of conventional liquid brews. It is known for example that the desired necessary production of carbon dioxide, at a uniform continuing rate, is related to activation and growth of yeast cells in response to the environmental factors present in the brew. The yeast, itself, like any living organism, brings about changes in the brew medium during the course of fermentation. Such changes, which may be a form of autolysis, are shown by the depletion of fermentable substances, accumulation of unwanted waste products, such as alcohols, acids, esters, cellular enzymes, the modification of pH conditions, and other changes representative of a highly complex system. Moreover, while the primary physiological activity of yeast is that of fermentation, the yeast also undergoes a certain degree of growth or multiplication. Continuing fermentation reactions therefore increase the opportunity for uncontrolled conditions, including those attributable to different strains or races of yeast, as conventionally encountered.

The present invention overcomes many if not all of the problems heretofore encountered in the use of yeast fermented liquid brews, through use of certain stabilizing agents which in addition to controlling the pH of the brew to a value within a range of about 4.0 to 4.8, also provide a certain nutrient value to the yeast. In general, satisfactory stabilizing agents found to be compatible with the brew and dough systems normally used in bakery operations are selected from the group consisting of cereal flours, soy flour, whey, dry nonfat milk, calcium carbonate, and mixtures or blends thereof. With the exception of calcium carbonate, all these compounds provide a nutrient value to the yeast and therefore assist in the gassing activity initiated by the yeast cells. They also are effective in providing the desired pH control. All the compounds are non-toxic and do not form any toxic or otherwise objectionable by-products with other ingredients of the brew or ingredients of the dough mixture. They have no detrimental effect upon the flavor, nutrient value or other essential properties of the brew or the final dough or bakery products.

While the chemistry involved in use of the specified stabilizing agents is not clearly understood, the desired effects are undoubtedly associated with the adjustments of pH and temperature to achieve both the desired buffering or stabilizing effects in the brew and the subsequent inhibiting effect upon continuing yeast fermentation in the dough.

In a particularly satisfactory practice of the invention, the stabilizing agent added to the brew comprises a small proportion of the flour requirements of the dough. More specifically, the introduction into the brew of about 3 to 7% of the total flour requirements of the dough serves to effect the necessary pH adjustment, and also assists in initiating the gas producing activity of the yeast cells. The precise amount of flour added to the brew will depend to some extent on the amount of yeast present, the concentration of the brew (e.g., the water content), and the brew temperature subsequently to be employed in the brew step 12. Also important is whether additional stabilizing agents are used with the flour. As noted previously, certain additional stabilizing agents, including specifically whey, calcium carbonate and dry nonfat milk, can be used together with the flour to provide the desired stabilizing effect. In such case, the amount of additional stabilizing agent will fall within the range from about 2 to 5%, based on the flour content of the dough.

Alternatively, dry whey, calcium carbonate, and/or dry nonfat milk may be used as stabilizing agents in the absence of flour, either individually or in combination with one another. In such case, the proportion of such materials used as stabilizing agents will range from about 3 to 10% on the flour content. When whey is used as the stabilizing agent, it generally is employed in the form of dry whey solids. Whey powder in satisfactory form for use in the present invention can be obtained by evaporating and spray drying raw whey obtained from the manufacture of cheddar, Swiss and/or cottage cheese. Spray dried whey powder is also particularly suited to use in processes employing the biochemical activating and maturing agents disclosed in our prior Patent 3,053,666. Instead of whey, dry nonfat milk solids (i.e., skim milk powder) may also be used as the stabilizing agent. Spray dried milk solids of this type are readily available, for example, in the form of a spray dried powder as produced by the technique disclosed in Patent 2,088,606. Calcium carbonate also functions satisfactorily as a stabilizing or buffering agent in the yeast brews of the invention, and in the proportions specified, is particularly satisfactory in controlling the pH to a value within the desired range of 4.0 to 4.8.

The mixing of the ingredients to form the brew can be carried out in conventional fashion. Thus, the amounts and types of yeast and yeast foods added to the brew can correspond to the amounts and types of these ingredients used in conventional brew practices. To illustrate, the yeast may be in the common compressed form but, preferably, is in the form of active dry yeast. The yeast foods can include those substances normally employed in the industry to support the growth and activities of the yeast (e.g., fermentable carbohydrates, amino acids, minerals and salts). The emulsifier need be added only in an amount sufficient to keep foaming to a minimum. The mixing procedure likewise can be carried out in conventional apparatus for the purpose. By way of illustration, the ingredients can be weighed into a stainless steel tank equipped with a paddle agitator and a thermometer, and the brew temperature adjusted by adjusting the temperature of the water to provide desired slurry temperatures.

Following dispersion of the brew ingredients in step 10, the yeast responds to the conditions in step 12 by initiating the desired production of carbon dioxide gas. In this regard, the yeast cells act upon the fermentable carbohydrates in the brew to transform the available sugars into carbon dioxide gas and alcohol, in accordance with well known fermentation reactions. It is a feature of the present invention, however, that the amount of carbohydrate or sugar in the brew is limited or controlled so that the available sugar is just sufficient to initiate gas production at a desired uniform relatively high rate. Control of the amount of sugar present is intended to prevent continuing fermentation reactions subsequent to the processing in step 14, for example, during storage or holding of the brew for subsequent use in a bakery process, as in step 16. Accordingly, in a preferred practice of the invention, sugar is added to the brew in a proportion ranging from about 0.75 to not in excess of 1.75% by weight of the brew. In like fashion, the proportion of salt added to the brew is preferably within the range of about 0.5 to 1.0% of the weight of the brew. Best results are obtained when the proportion of sugar is no more than about 1.5% on the brew and the proportion of salt is less than about 0.75%.

The volume of water used in the brew is generally based on the flour content of the dough, and can range from as low as 5% to as high as 90% of the total water requirements of the dough. Unexpectedly however, optimum characteristics in the final bakery products (measured by volume and grain quality) are obtained with relatively concentrated brews containing about 5 to 30% of the total water requirements of the dough, or alternatively, with brews containing about 70 to 90% of the water requirements of the dough. Substantially less satisfactory results are obtained with intermediate proportions of water (i.e., 30 to 70%). Surprisingly, the shortest proof times and also the best proof tolerances are obtained with the more concentrated brews (i.e., 10 to 20% water based on the flour). As will be apparent, the ability to use relatively concentrated brews is a feature of considerable importance to the commercial baker, in view of permitted reductions in tankage requirements. By way of illustration, a 10% brew concentrate occupies approximately 20 to 25% of the brew volume customarily required in commercial bakery operations. Reduced volume requirements of the stable brews of the invention are attributable, at least in part, to the different role or function of the brew step in carrying out the present invention.

In general, and assuming the preparation of a yeast stable liquid brew being held at a temperature below about 60° F. (step 16), the proportion of ingredients in the brew can be substantially as follows:

|  | Percent |
| --- | --- |
| Flour | 7–20 |
| Water | 65–90 |
| Yeast | 5–13 |
| Yeast food | 0.75–2 |
| Salt | 0.5–1 |
| Emulsifier | 0.5–1.5 |

The above generalized formula for the final brew takes into account the fact that, under optimum conditions, the fermentable sugar present in the original brew is almost entirely used up in fermentation reactions to produce carbon dioxide gas. In general, the final brew will contain no more than trace amounts of residual sugar, although small amounts of residual sugar ranging up to 0.5 to 1% on the brew will not substantially detract from the more or less yeast stable condition of the brew. It will be appreciated that the proportion or amount of fermentable sugar originally added to the brew will vary to some extent with the concentration of the brew, and with the brew times and temperatures in step 12. Thus, in a fairly concentrated brew containing 10 to 20% of the water requirements of the flour, the sugar requirements will vary within a range from about 0.5 to 1.5% on the weight of the brew. On the other hand, brews containing 80 to 90% water on the flour can satisfactorily employ sugar in amounts ranging as high as 2 to 4% on the brew. In the preferred practice of the invention based on use of the concentrated brews, the proportion of sugar in the starting brew will normally fall below about 1.75% of the weight of the brew. It will be understood that the term "sugar" as used herein refers to fermentable sugars in the broad sense, including any material predominantly comprised of monosaccharides (e.g., fructose, glucose) or di-saccharides (e.g., sucrose, maltose), or mixtures thereof.

As noted previously, the brew fermentation step as carried out in step 12 serves the purpose of initiating yeast fermentation reactions to the point of producing gas at a desired uniform high rate, necessary to the subsequent baking operations. However, since gas production is the only fermentation reaction of importance in systems making use of the chemical dough modifying agents, the desired gassing effects are obtained in the brew systems of the present invention in a very short brew fermentation step, i.e., within the range from about 25 to 45 minutes. The length of a particular brew period, in step 12, depends in large measure upon the temperature at which fermentation is carried out. Thus, at 85 to 95° F., the desired gassing rate can be obtained in about 30 minutes. At lower temperatures, say 75 to 80° F., a brew period as long as 45 minutes may be required. On the other hand, at significantly higher brew temperatures, say 90 to 95° F., brew fermentation periods as short as 20 to 25 minutes are possible.

Once the brew has achieved the desired gassing rate, the brew is immediately cooled to a temperature below about 60° F. (step 14), to inhibit further gas producing activity of the yeast cells and to suppress the yeast fermentation reactions. While the brew can be cooled to temperatures appreciably below 60° F., with very effective suppression of the fermentation reactions, cooling to a temperature below about 50 to 55° F. is normally not jusified by the circumstances of commercial operations. Thus, as a practical matter, the advantages of cooling to a lower temperature will in most instances be outweighed by the disadvantages of the higher cost of cooling together with the cost of subsequently raising the brew temperature back to normal dough processing temperatures.

As noted above, the effect of cooling in step 14 is not only to suppress further yeast fermentation reactions but, more importantly, to permit the brews to be held in stable form, as in step 16, for subsequent or delayed use as needed in the bakery. Thus, I have found that yeast brews processed in the herein described manner are completely stable for periods ranging up to 8 hours, as determined by the properties of the final bakery products, with little or no instability being shown in brews held as long as 24 hours (note Table I). In continuous-mix operations, the brews can be held for relatively long periods of time, and then incorporated as needed in the premixing unit of the continuous-mix apparatus, as represented in step 18 of FIGURE 1. The functioning of the brews in carrying out the subsequent steps in the continuous-mix processing, as respects the degree or amount of mechanaical working and the ease of extrusion in steps 20 and 22, is in every respect equal to or better than that of conventionally yeast fermented brews. In contrast, however, the difficulties involved in sequentially setting the separate brews in accordance with the conventional practice, is entirely avoided. Significantly, use of the stable brews in the continuous-mix operation with the biochemical activating and maturing agents makes possible the processing of the dough at optimum rates of gas production, with virtually no interference with the activating and maturing effects of these chemical dough modifying ingredients.

As disclosed in our prior Patent 3,053,666, satisfactory biochemical agents for activating the gluten in dough are selected from the group consisting of L-cysteine hydrochloride, glutathione and sodium bisulfite salts, and mixtures of these compounds. All of these compounds are sulphur-containing type reducing agents. They are nontoxic and do not form any toxic or otherwise objectionable by-products with other ingredients of the mix. They have no detrimental effect upon flavor, nutritive value or other essential properties of the final product. Small amounts of one or more of these agents have been found to accelerate development of proper dough consistency and to improve extensibility. Compounds related to, homologous with, or derived from L-cysteine hydrochloride can be used, such as D and DL cysteine hydrochloride, the free bases of L and D and DL cysteine, L-cysteine, L-cysteine monophosphate, di-L-cysteine sulfate and L-mono-cysteine tartrate. Homocysteine is likewise related to the foregoing compounds, and can be used. Various sulfite salts, such as potassium bi-sulfite and sodium or potassium sulfite can be used in place of sodium bisulfite. Also, related compounds, such as hydrosulfite and pyrosulfite salts may be employed. Natural foods such as inactive dry yeast, unheated soy flour, etc., may also be used as sources of cysteine and/or glutathione.

The biochemical maturing agents added in step 18 can likewise be the same as disclosed in our prior patent. Such ingredients include conventional oxidizing compounds such as potassium bromate, potassium iodate, calcium peroxide and potassium persulfate and, in addition, acetone peroxide and azodicarbonamide oxidizing compounds. Mixtures of these various oxidizing compounds are also satisfactory for use in the invention and, in fact, mixtures of oxidizing compounds are customarily used to obtain variable effects at different points in the processing. The levels of addition of the biochemical agents are substantially as disclosed in our prior patent.

The following table sets forth operable ranges of use of the biochemical agents, in connection with the desired stable brew processing, expressed as percent of flour.

| Dough additive: | Operable range, percent of flour |
|---|---|
| Cysteine HCl | .002–.020 |
| Potassium bromate | .002–.012 |
| Glutathione | .002–.025 |
| Potassium bromate | .002–.010 |
| Sodium bisulfite | .002–.015 |
| Potassium bromate | .002–.013 |

In general, doughs processed according to the stable brew procedure herein described possess mixing and machining characteristics equal or superior to those obtained by the conventional sponge dough method and superior to those obtained by the conventional continuous-mix operations. The finished bakery products, specifically bread, have loaf volumes equal to or better than conventional breads, and possess symmetry, color, grain softness, and flavor equal to or better than the best commercial sponge breads and substantially better than the best continuous-mix breads.

In the following examples of our invention, the concentrations of ingredients in the brew formulations are expressed as a percent of the brew. All other concentrations of ingredients related to the preparation of dough for bakery products are expressed as a percent of the flour.

EXAMPLE 1

Preparation of stable brew concentrate

To prepare a brew concentrate which will provide 20% water on the weight of the flour, each 1000 lbs. of flour to be processed into dough requires a final brew weighing approximately 292 lbs. and containing 69% water (200 lbs.) at the time of use. The amount of flour to be processed in a day's baking operations, in thousands of pounds, therefore provides a measure of the water requirements as well as the total amount of brew for the day's operations.

The brew is prepared in a stainless steel tank with a volume half again as large as the volume of the water requirements of the final brew. A 50-gallon tank is thus adequate for 200 lbs. of water (24.95 gallons). The tank is equipped with a high speed agitator, slow speed paddle, a lid and a thermometer.

Procedure (1) Introduce 70% of the total water requirements to the mix tank (140 lbs. or 17.5 gallons/1000 lbs. of flour) in the dough.

(2) Add flour in a proportion comprising 5% of the total flour to be processed in the dough, and blend with the water. For convenience, the water is at a temperature to provide a mix temperature of 91±2° F.

(3) 10 lbs. of sugar, 6 lbs. of yeast food, 3 lbs. of emulsifier, and 2.5 lbs. of salt are added and blended into the mix for each 1000 lbs. of total flour.

(4) At zero time, 30 lbs. of yeast are added per 1000 lbs. of total flour, using the slow speed agitator. The brew starting temperature should be 90° F.±1° F.

(5) Ferment 30 minutes using the slow speed paddle.

(6) Add ice in proportion to cool the brew concentrate to 60° F.±2° F., and to obtain the final water content. If necessary, adjust the water/ice ratio to get the necessary cooling. (Alternatively, cooling can be accomplished by use of a heat exchanger, in which case water chilled to the necessary cooling temperature is added to the brew after the 30-minute fermentation period, and the brew concentrate passed through the heat exchanger to cool the brew to 60° F.±2° F.)

(7) Transfer the cooled brew concentrate to a jacketed stainless steel holding tank equipped with a slow speed paddle agitator and a water cooling system having controls to maintain the brew at 60° F.±2° F. The prior addition of ice to the brew concentrate checks or suppresses the production of carbon dioxide gas, the transfer of the brew to the holding tank additionally expelling dissolved or occluded gas. The volume of the brew concentrate in the holding tank is reduced to approximately that of the original brew, the viscosity is 800–1100 centipoises, the density is approximately 1.01 grams per cc. the pH is 4.3±0.1, and the titratable acidity is 90±10 ml. of 0.1 N NaOH per 10 grams of brew.

(8) Throughout the holding period, the brew is maintained at 60° F.±2° F., using slow speed agitation to keep the flour and other suspended solids from settling out.

The brew is piped and metered directly to the batch mixer, or the premixer of continuous-mix apparatus. The preferred method of weighing and addition is by pumping to a small stainless steel tank mounted on a floor scale, with a 20-gallon tank with a 25 to 200 lbs. scale being adequate for the concentrated brews.

Final brew composition

| Ingredient: | Percent of brew |
|---|---|
| Flour | 17.3 |
| Water | 69.0 |
| Yeast food | 1.7 |
| Yeast | 10.3 |
| Salt | 0.7 |
| Emulsifier | 1.0 |

EXAMPLE 2

Preparation of stable brew—high water

A high water brew providing 80% water on the weight of the flour is prepared substantially as in Example 1, except that in this case, approximately 605 pounds of final brew is required for each 1000 pounds of flour to be processed into dough. The high water brew, at time of use contains approximately 83.3% water (504 pounds). The mix tank can be as before, except that a substantially larger tank (i.e., 150 to 200 gallons) is required to accommodate the greater amount of water.

Procedure (1) Introduce 70% of the total water requirements to the mix tank (353 lbs. or 42.5 gallons/1000 lbs. of flour in the dough).

(2) Add 5% of the total flour and blend, using water at a temperature to provide a temperature after mixing of 91° F.±20° F.

(3) Add 10 lbs. of sugar, 6 lbs. of yeast food, 3 lbs. emulsifier and 3.6 lbs. of salt for each 1000 lbs. of total flour, and blend with the other brew ingredients.

(4) At zero time, add 30 lbs. of yeast per 1000 lbs. total flour, using the slow speed agitator. Brew starting temperature should be 90° F.±1° F. (If required, adjust water temperature for the next brew concentrate to give 90° F. starting temperature.)

(5) Ferment 35 minutes using the slow speed paddle.

(6) Add ice equal in weight to the additional 151 lbs. of water needed in the brew, and agitate. The brew concentrate is quickly cooled to 60° F.± 2° F. Do not add the ice (or water in the alternate procedure) at the beginning of the fermentation. When all of the brew has cooled to 60° F. or below, and is well mixed, it is ready for use in dough processing.

(7) Transfer the cooled brew concentrate to a jacketed stainless steel holding tank (as in Example 1) and hold the brew at 60° F±2° F., using the slow speed paddle. The volume will drop approximately to the original volume, the viscosity is 700–1000 centipoises and the density is approximately 1.01 grams/cc. The pH and titratable acidity are essentially as in Example 1.

(8) The brew is maintained at 60° F.±2° F., under slow speed agitation as before, to keep ingredients from settling out.

The brew is used as before (Example 1).

Final brew composition

| Ingredient: | Percent of brew |
|---|---|
| Flour | 8.24 |
| Yeast | 4.95 |
| Yeast food | 0.82 |
| Sugar | 1.63 |
| Emulsifier | 0.48 |
| Salt | 0.58 |
| Water | 83.30 |

EXAMPLE 3.—COMMERCIAL STRAIGHT DOUGH PROCESS USING STABLE BREW CONCENTRATE

| Ingredient | Dough formula Pounds | Percent on flour |
|---|---|---|
| Flour | 500 | 100 |
| Sugar | 30 | 6 |
| Shortening | 15 | 3.0 |
| Salt | 10 | 2.0 |
| Yeast | 15 | 3.0 |
| Yeast food | 3.75 | 0.75 |
| Softener (mono- and di-glyceride) | 1.5 | 0.3 |
| Enrichment (vitamin-minerals) (pills) | 5 | 1 |
| Spray dried whey product* | 15 | 3 |
| L-cysteine HCl from product | (0.045) | (0.009) |
| Potassium bromate from product | (0.0270) | (0.0054) |
| Water | 335.0 | 67.0 |

*Consists of a blend of spray dried whey, 67.5%, with 0.3% L-cysteine HCl, 0.2% potassium bromate, 28% white corn flour, and 4% monocalcium phosphate.

Procedure (1) Weigh required flour into mixer. The formulation of the stable brew concentrate is such that a 3% yeast brew supplies 5% of the total flour. The dough formula thus requires 495 pounds of flour.

(2) Add 30 lbs. of sugar, 15 lbs. of shortening, and the additional salt not supplied by the 146 lbs. of brew needed to supply 3% yeast (i.e., 10.0–1.02, or 8.98 lbs. of salt). Add mold inhibitor and mineral vitamin enrichment.

(3) Add 15 lbs. of the whey product containing the chemical dough modifying agents.

(4) Weigh or meter 146 lbs. of stable brew concentrate into the mixer.

(5) Meter in the remaining water not supplied by the brew (234 lbs.).

(6) Mix the dough 0.5 to 1.0 minute on low speed.

(7) Mix to full development on high speed (10–11 minutes).

(8) Adjust jacket on mixer bowl to give a final dough temperature of 80° F.±1° F.

(9) Provide a floor time of 30±10 minutes.

(10) Divide, round and overhead or intermediate proof for 12 minutes.

(11) Mold and proof 60–65 minutes at 113° F. and 85% relative humidity.

(12) Bake proofed loaves at 400° F. for 25 minutes.

(13) Cool, slice, and wrap in the conventional manner.

Results

The development out of the mixer is excellent at machining time, the machining properties being especially good, sheeting and cutting very easy and fine, giving very uniform shaped pieces. The loaf volumes are 2510±20 cc./lb. and the grain quality is 9.2±3, equivalent to high quality sponge and dough breads. The loaves are of excellent contour with uniform symmetry and desirable break and shred.

In the above example, a preferred procedure for using a stable brew concentrate in a straight dough method for enriched white bread, employing a whey/L-cysteine/bromate blend is set forth. The example shows a water absorption of 67% which tends toward the maximum desirable. Lower water absorption may be desired depending on the characteristics of the flour in use, in which case a ready adjustment can be made by a suitable reduction in the water added at the mixer.

The above process with only minor changes may readily be employed for making different types of bread, buns and rolls in which yeast percentages may advantageously be varied. In such instances the amount of brew concentrate added to the mixer is readily decreased or increased as desired, and adjustments in salt and water added to the mixer adjusted accordingly (upward or downward if needed). When making buns, it is desirable to mix the dough as much as a full minute beyond the point of maximum development to provide a dough more nearly ideal for operation in the automatic bun forming machine.

EXAMPLE 4

Laboratory test, brew stability

Following the modified dough procedure of Example 3, straight dough breads are prepared with stable brews variously aged for periods ranging from 15 minutes to 24 hours. The results of this processing are shown in the following Table I.

TABLE I

| | Brew | | | Bread | |
|---|---|---|---|---|---|
| Time, min. | pH, units | Density, g./cc. | Proof time, min. | Loaf vol., cc./lb. | Grain quality, units |
| 0 [1] | 6.0 | | | | |
| 15 | 4.8 | 0.74 | | | |
| 5 | 4.7 | | | | |
| 20 | 4.6 | 0.71 | | | |
| 30 | 4.4 | | 57 | 2,510 | 9.1 |
| 60 | 4.3 | 1.08 | 58 | 2,490 | 8.9 |
| 90 | 4.3 | 1.04 | 58 | 2,500 | 8.9 |
| 120 | 4.2 | 1.07 | 57 | 2,550 | 9.8 |
| 180 | 4.2 | | 56 | 2,510 | 9.4 |
| 240 | 4.1 | 1.09 | 56 | 2,520 | 9.5 |
| 300 | 4.2 | 1.10 | | | |
| 360 | 4.2 | 1.10 | | | |
| 1,380 | 4.2 | 1.09 | 58 | 2,490 | 8.6 |

[1] Just before adding the yeast.

As shown in the table, brews held for periods ranging from 20 minutes up to 23.5 hours provide uniform proof times and loaf volumes in the final bread, with quality equal to or better than the best sponge and dough breads.

EXAMPLE 5

Use of stable brew in continuous process employing biochemical activating and maturing agents A production rate of 4000 lbs. of dough per hour is to be maintained. The following kinds and amounts of dough ingredients are provided for each hour of continuous-mix operation:

| Ingredient | Pounds | Percent (on flour basis) |
|---|---|---|
| Flour | 2,128.8 | 100.0 |
| Water | 1,447.6 | 68.0 |
| Yeast | 61.7 | 2.9 |
| Yeast food | 10.64 | 0.5 |
| Sugar | 170.3 | 8.0 |
| Salt | 42.6 | 2.0 |
| Fat (stabilized) | 74.5 | 3.5 |
| Inhibitor (mold) | 2.8 | 0.13 |
| Emulsifier | 6.39 | 0.30 |
| Dry whey product* L-cysteine (from whey product) | 63.9 | 3.0 (0.0075) |
| Enrichment (vitamin-mineral) (pills) | 20 | 1 |
| Potassium bromate | | 0.0065 |
| Potassium iodate | | 0.0015 |

*Containing 99.75% spray dried whey blended with 0.25% L-cysteine HCl.

Procedure (1) All ingredients are fed at metered rates into the premixer of a Wallace & Tiernan Model 60 continuous-mix unit.

(2) The stable brew concentrate prepared as in Example 1 at 60° F. or below is metered through a heat exchanger to provide cooling or heating as required to maintain a dough temperature between 86° to 92° F. The brew feed is adjusted to provide a steady feed rate equivalent to 615 lbs./hour, a quantity which provides all required yeast, all required yeast food, all required emulsifier, 424.6 lbs. of water, 4.31 lbs. of salt and 5% or 10.6 lbs. of flour.

(3) The remaining 95% of the flour or 2118.2 lbs. per hour is metered separately into the premixer.

(4) The shortening (stabilized fat) is metered separately at a rate of 74.5 lbs. per hour.

(5) The biochemical maturing agents are dissolved in 1% of the total water for the dough (14.5 lbs.) and the resulting solution fed at a metered rate over a 1 hour period.

(6) The whey-L-cysteine product is dry fed to the premixer at the rate of 63.9 lbs. per hour.

(7) The remaining ingredients, 1023 lbs. water, 170.3 lbs. sugar and 38.3 lbs. of salt are combined, and the resulting solution fed at a metered rate over the course of an hour through a heat exchanger controlling the temperature to provide a dough temperature between 86° F. and 90° F. (It is convenient to blend the brew stream and the sugar-salt solution just ahead of the heat exchanger.) There are advantages to passing only the sugar-salt solution through the heat exchanger to control dough temperature.

(8) At the beginning of the run developer speed is adjusted to give optimum dough development.

(9) The dough is panned, proofed, baked, and the resulting bread cooled, sliced and wrapped as usual.

Results

Properties of the dough are highly favorable over a prolonged period. Proofing time holds remarkably steady from 60–64 minutes through a period of time exceeding 7 hours, while loaf volume likewise holds at 2505±15 cc./lb. for the same duration of holding the brew. The grain quality ranged during the same period (i.e., 7 hours) between 9.2±0.3, equivalent or superior to conventional sponge breads, without the inconvenience of the frequent preparation of the conventional full water brews.

The indicated ability of the stable brews to provide uniform, dependable leavening activity for periods as long as 24 hours makes feasible and advantageous the preparation of a single stable brew (master brew) for a complete operating shift. Moreover, changes in protein development which are relatively commonly experienced in conventional brews during 4 to 6 hours holding, are avoided. Such changes have heretofore required adjustments in the levels of the maturing agent during the processing with consequent changes in the development activity within the dough, which were neither necessary or desirable. The stable brews of the present invention enable use of the chemical dough modifying agents in such manner as to accomplish the objectives of their use in a steady reliable manner throughout the course of dough processing.

The foregoing examples set forth operating conditions which are convenient and advantageous, and which permits minor adjustments as required during prolonged operating runs. Thus, in continuous process where a separate dry feeder is used for the whey-L-cysteine product, very minor adjustments can be readily made, or alternatively, it is thoroughly feasible to add such product blended with the flour as may be necessary for equipment accommodation. The characteristics of the stable brew also facilitate addition of the biochemical agents directly to the brew just prior to use of the brew in processing of the dough. These advantageous results stem, at least in part, from the changed composition of the stable brews, as compared to the standard brew compositions. For example, the use of only a small part of the water in the concentrated stable brews, together with the sugar and salt necessary for initial gas production, represents a significant change. Additional water, sugar and salt not supplied by the brew can, of course, be supplied during the mixing. Flexibility in use of the stable brews is therefore imparted to the entire bakery operation.

In the continuous-mix bread example above (Example 5), the continuous-mix apparatus has been designated as a Wallace & Tiernan Model 60 continuous-mix unit. Other available machinery for such operations can, of course, also be used, for example, the American Machine & Foundry continuous-mix unit.

To those skilled in the art to which this invention relates, many different applications and embodiments of the invention will suggest themselves without departing from the spirit and scope of the invention. In general, however, we have determined that the stable brew procedure disclosed herein can be satisfactorily employed in producing most any type of yeast-raised bakery product.

Thus, we have found it to be satisfactory for white bread; variety bread such as whole wheat, rye, raisin, honey-nut, etc.; crackers, such as soda crackers; sweet goods, such as raisin and cinnamon rolls, Danish rolls; coffee cakes; yeast-raised doughnuts; and in fact, virtually all types of yeast-raised bread, buns and rolls. The particular examples set forth above were chosen to illustrate the essential processing under different conditions of formula, procedure, equipment and desired end product. Naturally it is not feasible to illustrate all possible variations by specific example, and the disclosures and description herein should consequently be considered as purely illustrative and not in any sense limiting.

What I claim is:

1. In a process for preparing yeast stable brews capable of being held for substantial periods of time and subsequently used in the leavening of doughs, the steps of mixing essential brew ingredients including water, yeast, yeast foods, sugar and salt with a stabilizing agent selected from the group consisting of cereal and soy flours, whey, calcium carbonate, dry nonfat milk, and mixtures thereof, the mixed brew containing sugar in an amount just sufficient to initiate yeast fermentation reactions to produce gas at a desired uniform relatively high rate, holding the stabilized brew at a temperature within the range from about 75° to 95° F. for a period of time not in excess of about 25 to 45 minutes to achieve said desired gassing rate, said stabilizing agent being effective to control the pH of the brew to within a range from 4.0 to 4.8 without interfering in the gas producing activity of the yeast in the brew, cooling the brew to a temperature below about 60° F. to effectively inhibit the gas producing activity of the yeast cells and to temporarily suppress yeast fermentation reactions, and holding the brew at a temperature below about 60° F.

2. A process as in claim 1 in which the water in the brew comprises about 5 to 30% of the total water requirements of the dough.

3. A process as in claim 1 in which the water in the brew comprises about 70 to 90% of the total water requirements of the dough.

4. A process as in claim 1 wherein sugar is added to the brew in a proportion not in excess of about 1.75% of the weight of the brew.

5. A process as in claim 1 wherein salt is added to the brew in a proportion not in excess of about 0.75% of the weight of the brew.

6. A process as in claim 1 wherein gas production is initiated by holding the brew at a temperature between about 85° to 90° F. for a period not in excess of about 30 minutes.

7. A process as in claim 1 wherein the brew is rapidly cooled to a temperature below about 60° F., the period of cooling not exceeding about 5 minutes.

8. A process as in claim 7 wherein said brew is cooled by the addition of ice.

9. A process as in claim 1 wherein said brew in stabilized form is held at a temperature below 60° F. for periods of time ranging up to 24 hours.

10. As a new composition of matter, a yeast stable liquid brew at a temperature below about 60° F., capable of initiating a desired uniform relatively high rate of gas production in a dough at temperatures about 60° F., consisting essentially of the following ingredients:

| | Percent |
|---|---|
| Flour | 7-20 |
| Water | 65-90 |
| Yeast | 5-13 |
| Yeast food | 0.75-2 |
| Salt | 0.5-1 |
| Emulsifier | 0.5-1.5 | said liquid brew having a pH within the range from 4.0 to 4.8.

11. In a process of preparing leavened dough, the steps of preparing a liquid brew by mixing essential brew ingredients including water, yeast, yeast foods, sugar and salt with a stabilizing agent selected from the group consisting of cereal and soy flours, whey, calcium carbonate, dry nonfat milk, and mixtures thereof, the mixed brew containing sugar in an amount just sufficient to initiate yeast fermentation reactions to produce gas at a desired uniform relatively high rate, holding the stabilized brew at a temperature within the range from about 75° to 95° F. for a period of time not in excess of about 25 to 45 minutes to achieve said desired gassing rate, said stabilizing agent being effective to control the pH of the brew to within a range from 4.0 to 4.8 without interfering in the gas producing activity of the yeast in the brew, cooling the brew to a temperature below about 60° F. to effectively inhibit the gas producing activity of the yeast cells and to temporarily suppress yeast fermentation reactions, holding the liquid brew in a cooled stabilized form below about 60° F. for a period of time ranging from ½ to no more than 24 hours, and subsequently, mixing said brew at a temperature about 60° F. with additional ingredients including sugar, flour and water to form a leavened dough, the gas producing activity of the yeast cells being again initiated in the dough to obtain a desired optimum uniform gassing rate for mixing, dividing, proof and bake.

12. A process as in claim 11 in which the water in the brew comprises about 5 to 30% of the total water requirements of the dough.

13. A process as in claim 11 in which the water in the brew comprises about 70 to 90% of the total water requirements of the dough.

14. A process as in claim 11 wherein said additional ingredients include biochemical activating and maturing agents capable of effecting desired dough development and maturity with minimum development and maturing effects due to fermentation.

15. A process as in claim 14 wherein said biochemical activating agent is selected from the group consisting of cysteine, glutathione sulfite salts, and mixtures thereof and is added in an amount comprising about .002 to 0.025% by weight of the flour content of the dough.

16. A process as in claim 14 wherein said biochemical maturing agent is selected from the group consisting of bromate, iodate, persulfate and azodicarbonamide oxidizing compounds and mixtures thereof, and is added in an amount comprising about 0.001 to 0.01% by weight of the flour content of the dough.

17. In a process of preparing leavened dough making use of biochemical agents for developing and maturing the dough, the steps of mixing essential brew ingredients including water, yeast, yeast foods, sugar and salt with a stabilizing agent selected from the group consisting of cereal and soy flours, whey, calcium carbonates, dry nonfat milk, and mixtures thereof, the mixed brew containing sugar in an amount just sufficient to initiate yeast fermentation reactions to produce gas at a desired uniform relatively high rate, holding the stabilized brew at a temperature within the range from about 75° to 95° F. for a period of time not in excess of about 25 to 45 minutes to achieve said desired gassing rate, said stabilizing agent being effective to control the pH of the brew to within a range from 4.0 to 4.8 without interfering in the gas producing activity of the yeast in the brew, cooling the brew to a temperature below about 60° F. to effectively inhibit the gas producing activity of the yeast cells and to temporarily suppress yeast fermentation reactions, holding the liquid brew in a cooled stabilized form below about 60° F. for a period of time ranging from ½ to no more than 24 hours, subsequently mixing said brew at a temperature about 60° F. with dough forming ingredients including sugar, flour, water and biochemical activating and maturing agents, the biochemical activating agent comprising about 0.002 to 0.025% by weight of the flour content of the dough of a member of the group consisting of cysteine, glutathione, and sulfite salts, and mixtures thereof, the maturing agent comprising about 0.001 to 0.01% by weight of the flour content of the dough of a member of the group consisting of bromate, iodate, persulfate and azodicarbonamide oxidizing compounds and mixtures thereof, said mixing at a temperature about 60° F. initiating the gas producing activity of the yeast cells in the dough to again obtain desired uniform relatively high gassing rate, and thereafter subjecting the dough to operations to form individual units for proofing and baking.

References Cited

UNITED STATES PATENTS

| | | | |
|---|---|---|---|
| 3,053,666 | 9/1962 | Henika | 99—90 |
| 3,304,183 | 2/1967 | Johnson et al. | 99—90 |
| 3,391,004 | 7/1968 | Trum | 99—90 |

FOREIGN PATENTS 1,007,280  10/1965  Great Britain.

OTHER REFERENCES

Johnson et al.: The Bakers Digest, June 1957, pp. 29–35, 76 and 77.

Matz: Bakery Technology and Engineering, 1960, pp. 46–47.

Daniel: Bakery Materials and Methods, 4th ed., 1963, pp. 132–133.

Food Engineering, April 1956, p. 83.

LIONEL M. SHAPIRO, Primary Examiner